United States Patent [19]
Levenberg

[11] Patent Number: 5,611,639
[45] Date of Patent: Mar. 18, 1997

[54] LOCKING FASTENER CONSTRUCTION

[76] Inventor: Nat Levenberg, 2 Windsor Pl., Lynbrook, N.Y. 11510

[21] Appl. No.: 558,623

[22] Filed: Nov. 13, 1995

[51] Int. Cl.$^6$ ........................................ F16B 5/06
[52] U.S. Cl. ..................... 403/397; 403/319; 403/353; 403/407.1
[58] Field of Search ..................... 403/397, 353, 403/350, 154, 155, 319, 405.1, 406.1, 407.1, 408.1, 384, 315, 316

[56] References Cited

U.S. PATENT DOCUMENTS

| | | | |
|---|---|---|---|
| 2,621,357 | 12/1952 | Stuman | 403/353 X |
| 3,178,987 | 4/1965 | Reese et al. | 403/397 X |
| 3,596,942 | 8/1971 | Zoebelein | 403/407.1 |
| 3,814,491 | 6/1974 | Kackley | 403/353 X |
| 3,984,191 | 10/1976 | Doty | 403/155 X |
| 3,986,318 | 10/1976 | McConnell | 403/408.1 X |
| 4,317,416 | 3/1982 | Baum et al. | 403/407.1 X |
| 4,470,716 | 9/1984 | Welch | 403/407.1 X |
| 4,584,737 | 4/1986 | Ohman | 403/155 X |
| 4,786,119 | 11/1988 | Smuda | 403/406.1 X |
| 4,960,354 | 10/1990 | Moore | 403/397 X |

*Primary Examiner*—Harry C. Kim
*Attorney, Agent, or Firm*—Charles E. Temko

[57] ABSTRACT

An improved locking fastener construction for use in interconnecting and assembling the components of articles which are normally stored and shipped in knock-down condition to be assembled at a final location. The construction is particularly suited for assembling articles having abutting surfaces which would normally be interconnected by screws or rivet. The construction includes a planar base member having an interconnecting surface, a plurality of headed projections extending from said surface, an attachable member having a main wall and a laterally extending flange having shaped openings corresponding in size and location to the headed projections, and a corresponding number of synthetic resinous clip elements of limited flexibility adapted to engage the headed projections to maintain them within the corresponding openings and the laterally extending flange in contact with the interconnecting surface.

2 Claims, 2 Drawing Sheets

LOCKING FASTENER CONSTRUCTION

BACKGROUND OF THE INVENTION

This invention relates generally to the field of erectable devices, notably, knock-down type furniture and partitions, and more particularly to an improved locking fastener construction for rapidly and conveniently assembling the components of such devices to produce strong and rigid articles using only ordinary skills and without the use of tools.

It is known in the art to employ resilient locking clips for interconnecting small components in predetermined position relative to a mounting component having resilient elongated slidably engaged clips which obtain purchase upon a headed shank and are maintained in position by resilient forces having a line of action parallel to the axis of the shank. While not without substantial utility, such constructions afford less than total rigidity, and thus have relatively limited application. When assembling large articles such as a piece of furniture or office partition, absolute immobility between the parts is an essential.

SUMMARY OF THE INVENTION

Briefly stated, the invention contemplates the provision of an improved fastener construction in which the above requirement is obtained to a degree heretofore impossible. To this end, the construction includes a base member having a planar abutable surface, a corresponding abutable member having a surface substantially perpendicular to the abutable surface, and a laterally extending flange having keyhole shaped openings at predetermined intervals. Extending from the attachable surface are correspondingly located headed projections, usually a threaded screw or a nail, the shank of which is adapted to be maintained in the keyhole shaped opening against relative movement. A novel clip is formed of synthetic resinous material and includes means to engage the headed shank to provide both axially aligned tension thereon and a transverse force which serves to confine the shank within a laterally extending recess in the keyhole opening so that subsequent relative movement is impossible. The laterally extending force is obtained by contact of the clip with the perpendicular surface. The clip also includes a pair of legs defining a slot which engages the shank at an end portion thereof after passing a narrowed portion to effect a snap action.

BRIEF DESCRIPTION OF TEE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 1:
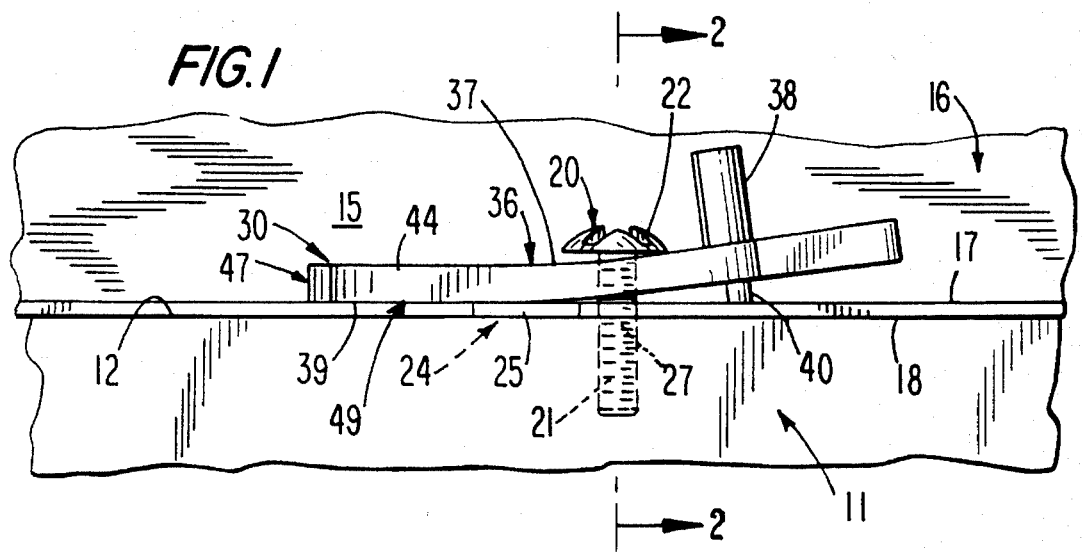
FIG. 1 is a fragmentary side elevational view of an embodiment of the invention in fully assembled condition.

In accordance with the invention, the embodiment, generally indicated by reference character 10, may be in the form of an assemblable office partition system, or desk, or other article of furniture which, in any case, will include a number of components which are selectively interconnectable in rigid relationship. For purposes of disclosure, the embodiment includes a base member 11 having an abutable surface 12, an abutable member 13 having a wall 14 perpendicular to the surface 12 and including a surface 15, the member 13 also including a laterally extending flange 16 having an inner surface 17 and an outer surface 18. In many instances, the base member 11 will be relatively thick, and the abutable member formed of sheet metal or similar materials.

The base member 11 mounts a plurality of headed fasteners 20, typically a screw, each of which includes a threaded shank portion 21 and a headed terminal 22. The flange 16 includes plural keyhole openings 24 in locations corresponding to the fasteners 20. Each opening including a circular portion 25 adapted to pass the terminal 22, and an L-shaped portion 26 forming a laterally extending slot 27 in which the shank 21 is maintained. During assembly, the fasteners 20 will be projected through the openings 24 and moved to a point where they are seated within a slot 27 to be maintained therein by structure described below.

A plurality of resilient clip elements maintain this engagement. Most suitably, the elements 30 may be of either left hand or right hand configuration, and are molded from synthetic resinous materials, typically polyethylene. The engagement of the clip element 30 with a respective fastener 20 is adapted to provide several components of force which result in rigid interconnection of the base member 11 with the abutable member 13. A first force is obtained by contact with the surface 15 of the wall 14 and has a line of action perpendicular to that surface. A second force exerts tension beneath the terminal 22 of the fastener to urge the flange 16 against the base member 11. A third force provides a clamping action about the shank 21 so as to maintain the clip element in engaged position.

Figure 2:
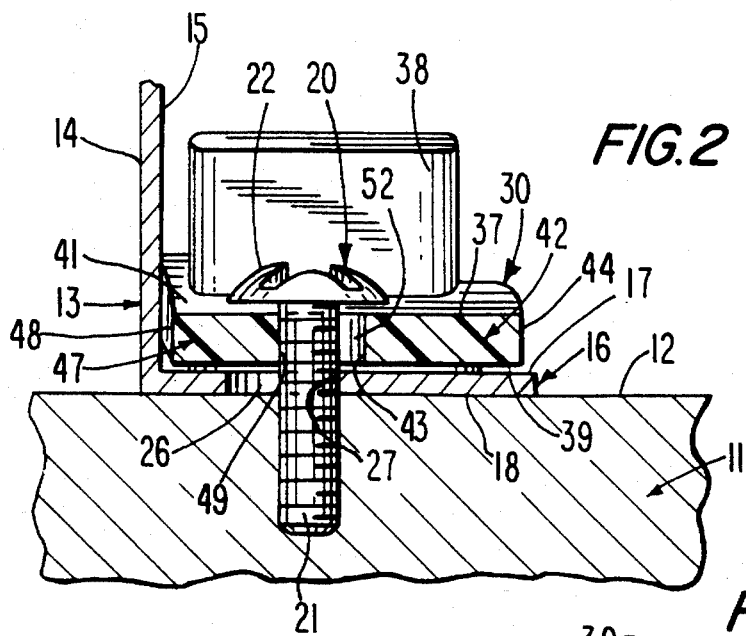
FIG. 2 is a fragmentary vertical sectional view as seen from the plane 2—2 in FIG. 1.
Figure 3:
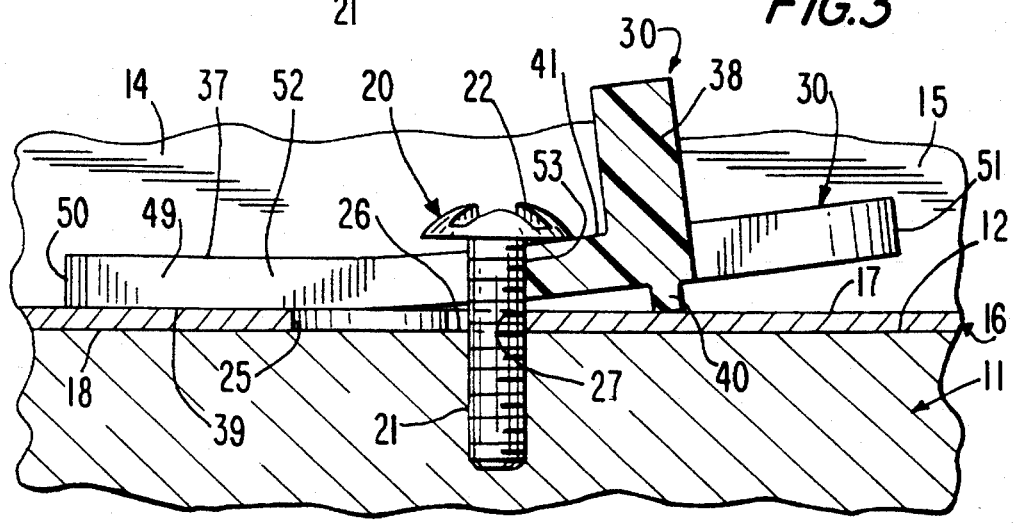
FIG. 3 is a fragmentary longitudinal sectional view as seen from the plane 3—3 in FIG. 4.
Figure 6:
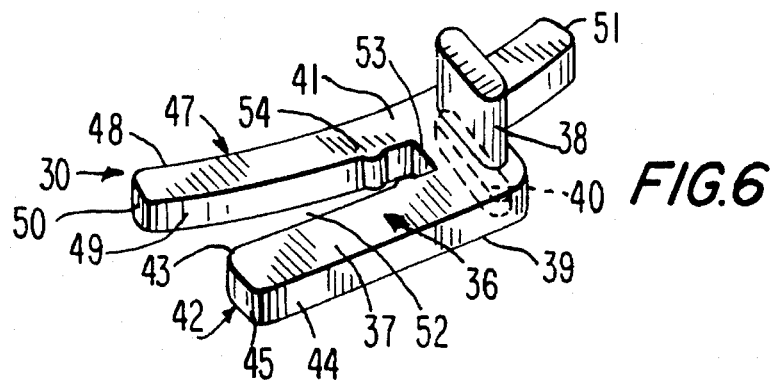
FIG. 6 is view in perspective of a clip element forming a part of the disclosed embodiment.
Figure 5:
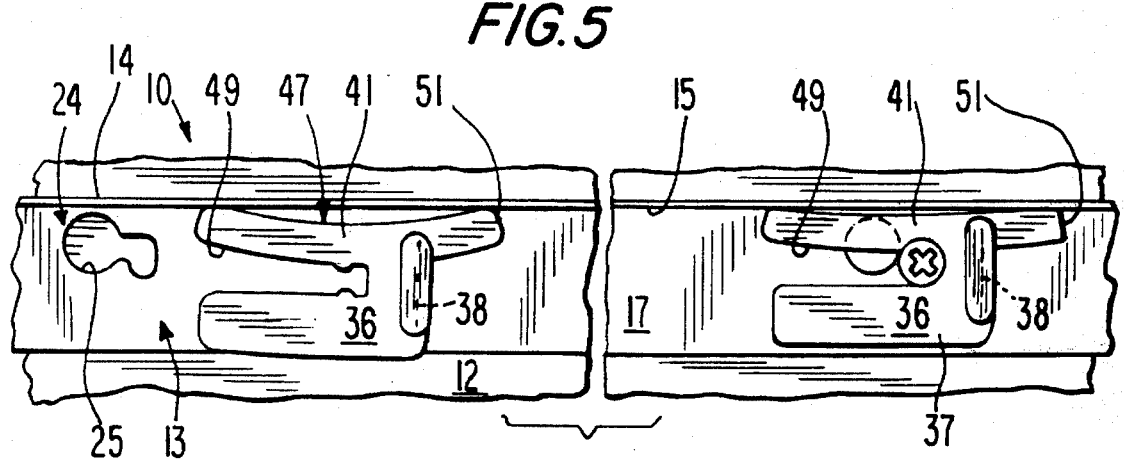
FIG. 5 is a fragmentary top plan view thereof showing multiple points of interconnection of the component parts.
Figure 4:
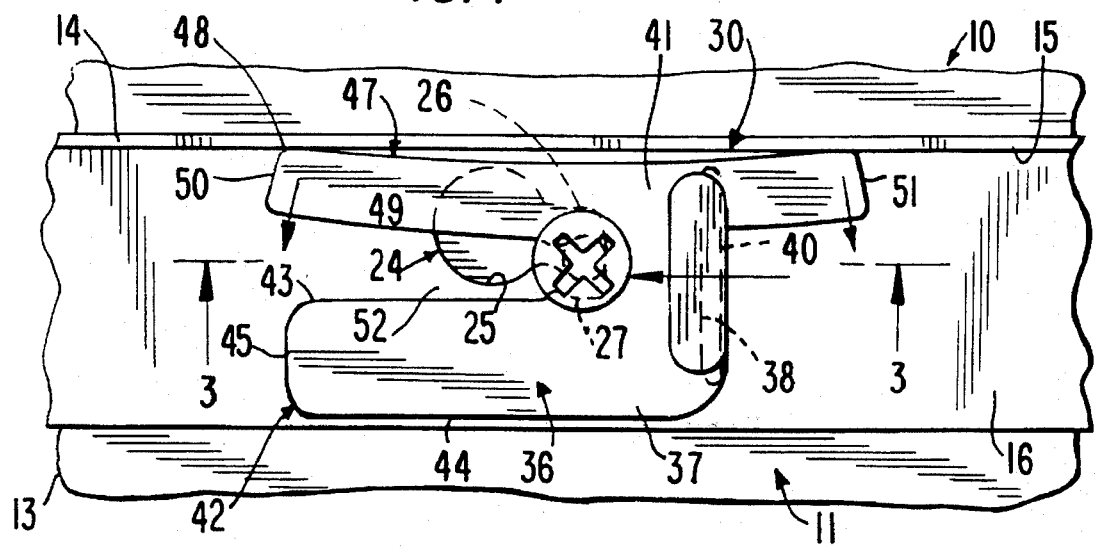
FIG. 4 is a fragmentary top plan view thereof.

Referring to FIGS. 1 to 5, inclusive, each element 30 includes a planar body 36 bounded by an upper surface 37 from which a finger engaging tab 38 projects, and a lower surface 39 from which a laterally extending projection 40 projects in an opposite direction. Projecting from one end of a centrally disposed portion 41 is a longitudinally extending leg 42 bounded by an inner side surface 43 and an outer side surface 44 which join to form a rounded terminal 45.

On an opposite side of the portion 41 is a flexible leg 47 bounded by an outer surface 48 and an inner surface 49 which join to form rounded terminals 50 and 51. The leg 42 and leg 47 form an open elongated channel 52 terminating at an inner end 53 adjacent a narrowed portion 54 which provides a snap action upon engagement.

From a consideration of FIGS. 1 through 4, inclusive, it may be observed that the clip elements 30 are conveniently engaged by manually pushing the tab 38 after the fastener 20 has been initially positioned within the channel 52. As the element 30 is moved into position, the projection 40, contacting the surface 17 of the flange 16, will progressively exert tension on the head of the fastener. With engagement, the flexible leg 47 will be straightened by contact with the surface 15 of the wall 14 and thus provide the laterally extending force necessary to maintain the shank member 21 within the slot 27. As the element 30 is progressively engaged, the shank will travel to the end of the channel 52 where it will be frictionally retained until removal is required.

It will be observed that because of the three above described forces obtained by the fastener upon the threaded shank, total rigidity in the interconnection of the base member with the abutable member is assured, and should a small degree of loosening occur in the fastener 20, the axial tension provided immediately takes up any slack.

Although the disclosed embodiment illustrates the interconnection of a sheet metal member with a relatively thick base member, it will be understood by those skilled in the art, that the abutable member may also be formed of relatively thick materials with a thin laterally extending flange attached thereto. Although best formed as a synthetic resinous molding, the clip element may also be formed as a sheet metal stamping where lower cost of production is desired.

I wish it to be understood that I do not consider the invention to be limited to the precise details of structure shown and set forth in the specification, for obvious modifications will occur to those skilled in the art to which the invention pertains.

I claim:

1. In combination, an improved locking fastener and a pair of separable structural members, the structural members including a base member having an abutting surface and an abutable member including a main wall perpendicular to said abutting surface and including a laterally extending flange, said flange having a surface adapted to abut said abutting surface on said base member; said locking fastener including at least one headed shank projecting from said abutting surface, said laterally extending flange having at least one opening engageable with said headed shank, said opening including a slotted portion corresponding in width to the diameter of said shank and extending in a direction perpendicular to the plane of said wall; said fastener comprising a resilient clip element slidably engageable with said headed shank and said main wall to maintain said shank in engagement with said slotted portion; said clip element including a resilient leg slidably engaging a surface of said main wall, and a second relatively non-resilient leg, said resilient and non-resilient legs forming a channel selectively gripping said shank.

2. The combination as set forth in claim 1, wherein said channel including a narrowed portion forming an overcenter snap action.

* * * * *